(12) United States Patent
Kakuno

(10) Patent No.: US 6,574,003 B1
(45) Date of Patent: Jun. 3, 2003

(54) PRINTER, PRINTER CONTROLLER, AND IMAGE INPUT/OUTPUT APPARATUS AND METHOD OF PRINTING

(75) Inventor: Norishige Kakuno, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/299,013

(22) Filed: Apr. 26, 1999

(30) Foreign Application Priority Data

Jul. 27, 1998 (JP) .......................................... 10-211299

(51) Int. Cl.[7] .............................. G06F 3/12; G06F 13/00
(52) U.S. Cl. ...................... 358/1.13; 358/1.14; 358/1.16
(58) Field of Search .............................. 358/1.13, 1.14, 358/1.16, 1.15, 3.29, 524, 453, 528, 504, 1.9

(56) References Cited

U.S. PATENT DOCUMENTS

| | | | |
|---|---|---|---|
| 5,216,754 A | | 6/1993 | Sathi et al. |
| 5,483,653 A | * | 1/1996 | Furman ....................... 395/650 |
| 5,586,229 A | * | 12/1996 | Kim et al. ................... 395/116 |
| 5,859,954 A | | 1/1999 | Toda |
| 5,889,931 A | * | 3/1999 | Noda ......................... 395/116 |
| 6,151,421 A | * | 11/2000 | Yamada ....................... 382/284 |
| 6,173,295 B1 | * | 1/2001 | Goertz et al. ................ 707/505 |

* cited by examiner

Primary Examiner—Jerome Grant, II
Assistant Examiner—Douglas Tran
(74) Attorney, Agent, or Firm—Sughrue Mion, PLLC (57) ABSTRACT

A printer includes an intermediate code preparation section that converts print data into intermediate codes for each band, and the thus-converted intermediate code is stored in memory. The intermediate code is expanded to bit-map data, and the bit-map data are transferred to a print engine. An expansion time measurement section measures the time required for expanding the intermediate code for each band. A comparison-and-determination section determines, for each band, whether or not the time required for expanding the intermediate code into the bit-map data exceeds a threshold value, thereby preparing a band management table. With regard to only the bands which exceed a threshold value, an expansion management table is prepared by copying the band management table. The expansion management table is converted into a sorted expansion management table in which bands are sorted in descending order of expansion time. Intermediate codes for the bands are expanded beforehand into bit-map data in descending order from a higher band to a lower order band in the sorted expansion management table, so long as memory for expansion is reserved.

29 Claims, 8 Drawing Sheets

FIG. 3A
BAND MANAGEMENT TABLE

| BAND NO. | EXPANSION T (msec) | ADDRESS OF INTERMEDIATE CODE | ADVANCE EXPANSION FLAG |
|---|---|---|---|
| 1 | 15 | 200040 | OFF |
| 2 | 32 | 200300 | ON |
| 3 | 50 | 200850 | ON |
| ⋮ | ⋮ | ⋮ | ⋮ |
| 59 | 30 | 219030 | ON |
| 60 | 10 | 219550 | OFF |

~ 18a

FIG. 3B
EXPANSION MANAGEMENT TABLE

| BAND NO. | EXPANSION T (msec) | ADDRESS OF INTERMEDIATE CODE |
|---|---|---|
| 2 | 32 | 200300 |
| 3 | 50 | 200850 |
| ⋮ | ⋮ | ⋮ |
| 59 | 30 | 219030 |

~ 18b

FIG. 3C
SORTED EXPANSION MANAGEMENT TABLE

| BAND NO. | EXPANSION T (msec) | ADDRESS OF INTERMEDIATE CODE |
|---|---|---|
| 3 | 50 | 200850 |
| ⋮ | ⋮ | ⋮ |
| 2 | 32 | 200300 |
| 59 | 30 | 219030 |

PRINTER, PRINTER CONTROLLER, AND IMAGE INPUT/OUTPUT APPARATUS AND METHOD OF PRINTING

BACKGROUND OF THE INVENTION

1. Field of the Invention

The present invention relates to an image input/output apparatus for temporarily storing image data received from a host in a first data format and outputting the image data after having converted the same to a second data format. More particularly, the invention relates to a printer, such as a laser printer, which stores image (or print) data in the form of an intermediate code and performs printing by expansion of the intermediate code to an image. The present invention also relates to a technique of controlling the printer.

2. Description of Related Art

In a printer, print data (e.g., a printer description language or the like) received from a host, such as a personal computer, are temporarily stored in a buffer after having been converted to a compressed intermediate code on a per-band basis. After initiation of a printing operation, the thus-compressed intermediate code is expanded to bit-map data, and the bit-map data are transferred to a print engine, where the bit map data are printed. To use memory efficiently, print data are converted into intermediate codes and stored in memory on a per-band basis. In response to initiation of the printing operation, the thus-stored intermediate code is expanded to bit-map data, and the bit-map data are transferred to the print engine.

Of the printers having the foregoing structure, a printer using an electrophotographic process, e.g., a laser printer, has a print engine comprising an optical writing system and a photosensitive member (c.g., a drum). Such a print engine usually has a constant print speed. If there is a delay in the print data processing performed by a print controller, e.g., a delay in expansion of the intermediate code to bit-map data, after initiation of a printing operation, the print data processing fails to catch up with the printing operation performed by the print engine, thus causing an overrun error. More specifically, an overrun error arises when the number or area of intermediate codes generated within one band exceeds a predetermined number or area corresponding to the engine speed.

In a conventional technique for reducing the number or area of intermediate codes, a threshold value is determined beforehand. If the number or area of intermediate codes exceeds the threshold value when print data are actually transmitted from the host and when intermediate codes are generated, the intermediate codes are temporarily expanded into bit-map data before a print request is made. Such a method is called an "advance expansion operation." For instance, in a page printer such as a laser printer, if the number or area of intermediate codes exceeds a certain threshold value during preparation of intermediate codes for one page, the intermediate code is temporarily expanded to bit-map data in a work memory, so long as memory space for advance expansion can be reserved. Intermediate codes are again reproduced from the thus-expanded bit-map data and are retained as compressed data.

The original intention of storing image data into memory in the form of an intermediate code is to save memory. However, some image data becomes larger in size (i.e., the amount of memory required) when in the form of an intermediate code than when in the form of real image data. To store intermediate codes instead of keeping the actual image data by a band buffer may disadvantageously cause an increase in the amount of memory used. In the case of text data, intermediate codes are made up of bit-map data based on the address in the memory of individual characters and information regarding the locations of the characters within a page. In the case of graphic data, intermediate codes are made up of path data specifying the profile of a drawing. Further, in the case of image data such as photographic image data, intermediate codes are made up of bit-map data regarding a photographic image and information regarding the position of the image within a page. In a case where a single page comprises a plurality of complicated minute characters and drawings, the amount of information regarding the characters and drawings and the amount of path data become enormous. Such a page requires a larger amount of memory when in the form of an intermediate code than when in the form of real image data. As mentioned above, depending on the degree of complication of intermediate codes when image data are converted to intermediate codes, the image data are subjected to advance expansion, so long as memory can be reserved, thereby preventing an overrun error.

In such a case, the following two techniques have conventionally been employed in order to prevent an overrun error while guaranteeing effective use of limited memory.

According to a first conventional technique, the intermediate codes, each of which is calculated for each band, are sorted according to a degree of complication. In descending order, image data are expanded to an image beforehand until there is achieved a threshold value, which corresponds to the point at which an overrun error arises. When memory for advance expansion has run out, advance expansion of image data into an image is aborted.

According a second conventional technique, the intermediate codes, each of which is calculated for each band, are compared with the threshold value in view of degree of complication. Data regarding a band whose degree of complication is greater than the threshold value are expanded to an image beforehand. If memory for advance expansion becomes exhausted during advance expansion, advance expansion of the image data is aborted upon exhaustion.

The first conventional technique enables reduction of the chance of an overrun by sorting the intermediate codes according to degree of complication, on a per-band basis. However, such a sorting operation consumes much time, thereby resulting in a reduction in overall throughput.

According to the second conventional technique, setting a threshold value to an appropriate value, according to which the degree of complication of an intermediate value is determined, is very difficult. In effect, complete prevention of an overrun error is impossible.

SUMMARY OF THE INVENTION

The object of the present invention is to provide an image input/output apparatus, such as a printer, which enables an improvement in throughput by shortening sorting time as compared to that required by the conventional technique, as well as to provide effective prevention of an overrun error.

In order to solve the previously-described problems, according to the present invention, a plurality of threshold values which ensure a printing operation are prepared, and the intermediate codes arc sorted according, to degree of complication, with regard to only bands which are excluded in advance from printable bands by use of the threshold values.

According to a first aspect of the present invention, there is provided a printer which converts print data to a first data format for each of a plurality of predetermined regions, stores the print data of the first data format into memory, reads from the memory the print data in the first data format for each of the regions, converts the read print data of the first data format to a second data format in response to a print request to thereby expand the print data in the memory, and transfers the print data of the second data format to a print engine, said printer comprising:

a determiner which determines, for each of said plurality of predetermined regions, whether or not a processing criteria relating to an amount of processing required for converting the print data from the first data format to the second data format exceeds a predetermined threshold value;

a sorter receiving an output from said determiner, wherein said sorter sorts only candidate regions having processing criteria determined to exceed the predetermined threshold value; and wherein said sorter sorts the candidate regions in descending order of the processing criteria after said determiner determines whether the threshold value has been exceeded for all of the predetermined regions;

a converter which converts the print data from the first data format into the second data format in descending order of the processing criteria for each of the regions; and a print engine to print data based on the print data of the second data format.

According to the invention, only the regions having processing criteria which have been determined to exceed the threshold value are taken as candidates for sorting. Hence, when compared to the case where print data are sorted for all the regions, sorting time can be shortened.

Preferably, the first data format corresponds to an intermediate code, and the second data format corresponds to bit-map data. Further, the processing criteria relating to the amount of processing includes at least a time required to convert the print data from the intermediate code to the bit-map data, for each of the regions. Only the regions whose conversion times have been determined to exceed the predetermined threshold value are taken as candidates for sorting.

The time required to convert the print data from the intermediate code to the bit-map data is compared with a threshold value, and only the print data regarding the regions whose conversion times have been determined to exceed the threshold value are sorted in descending order of conversion time, thereby shortening a sorting time and enabling effective prevention of an overrun error.

Preferably, the processing criteria relating to the amount of processing further includes the ratio of area of the intermediate code to that of the bit-map data. For the regions whose area ratio has been determined to exceed a predetermined threshold value, the print data related to the regions are converted from the first data format to the second data format regardless of their conversion time, and the data thus converted to the second data format are stored in the memory.

It is believed that with the selective sorting of the band regions according to whether or not an associated processing criteria exceeds a certain value, the probability of occurrence of an overrun error can be diminished further.

Preferably, the print data can be converted to the second data format beforehand and stored into the memory, as long as the amount of memory for storing the print data can be reserved.

As a result, an overrun error can be prevented without an unnecessary increase in memory.

Preferably, a plurality of different values are prepared as the predetermined threshold values, and one of the plurality of values is selected according to a print speed. Accordingly, the invention permits prioritizing of the print process based on print speed or avoidance of an overrun error.

BRIEF DESCRIPTION OF DRAWINGS

Printers according to embodiments of the present invention will be described hereinbelow by reference to the accompanying drawings.

FIGS. 3A to 3C are tables showing details of an intermediate code management table of the printer according to the embodiment, wherein

DESCRIPTION OF PREFERRED EMBODIMENTS

In the preferred embodiment, the printer is a so-called electrophotographic (laser) printer which forms an image on a transfer sheet, through use of an optical writing system using a laser beam as the light source, in combination with an electrophotographic process. More specifically, the printer is a page printer, wherein print data received from a host are converted to intermediate codes on a per-band basis, and the intermediate code is expanded to bit-map data after intermediate code data for one page have been fully prepared. The thus-expanded bit-map data are transferred to a print engine, and the bit-map data are printed on a per-page basis. Further, the page printer comprises a print engine operative at a predetermined engine speed. In the first embodiment, the following description is based on the assumption that the printer is a monochrome electrophotographic (laser) printer.

Figure 1:
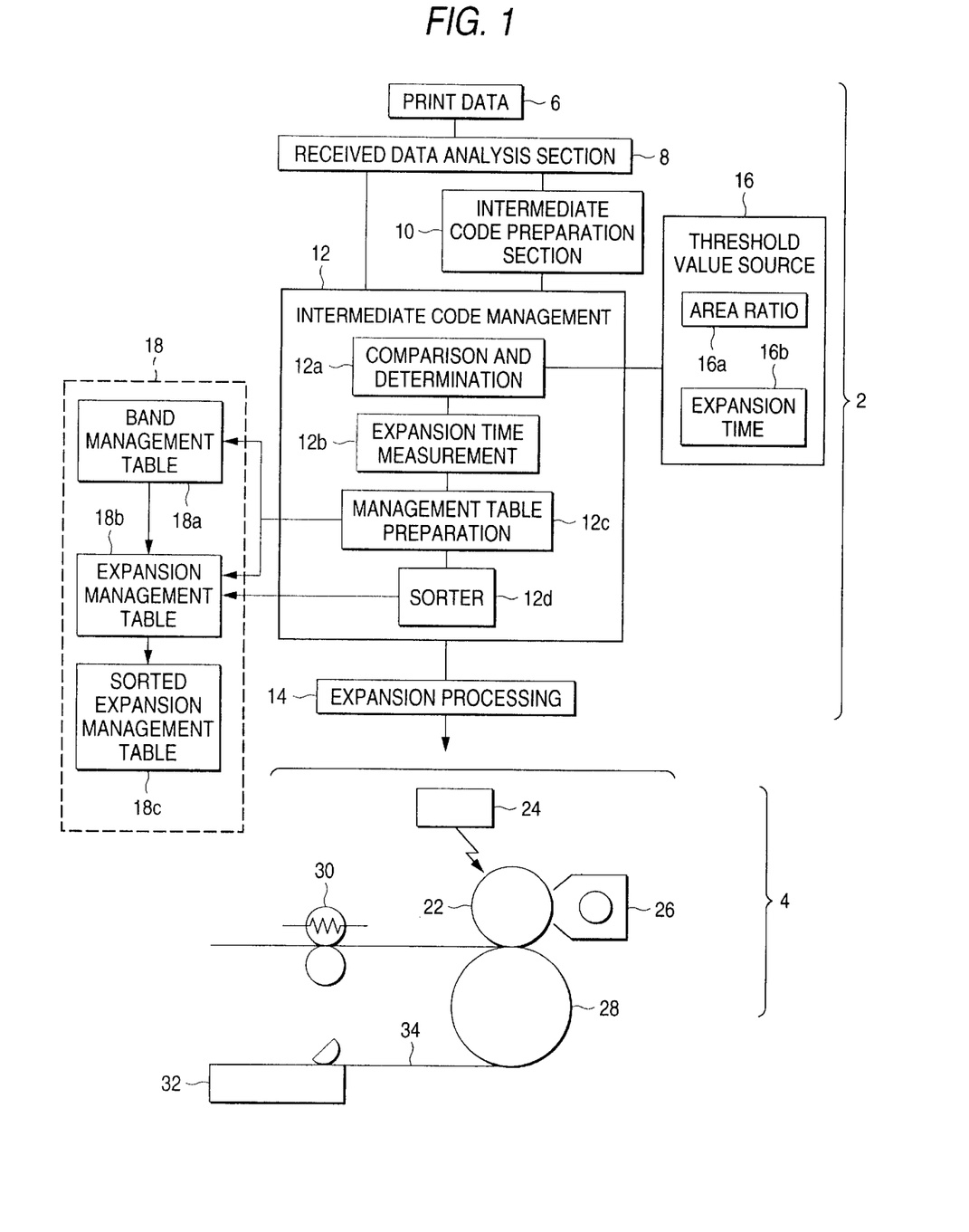
FIG. 1 is a functional block diagram showing a printer according to a preferred embodiment of the present invention.
Figure 2:
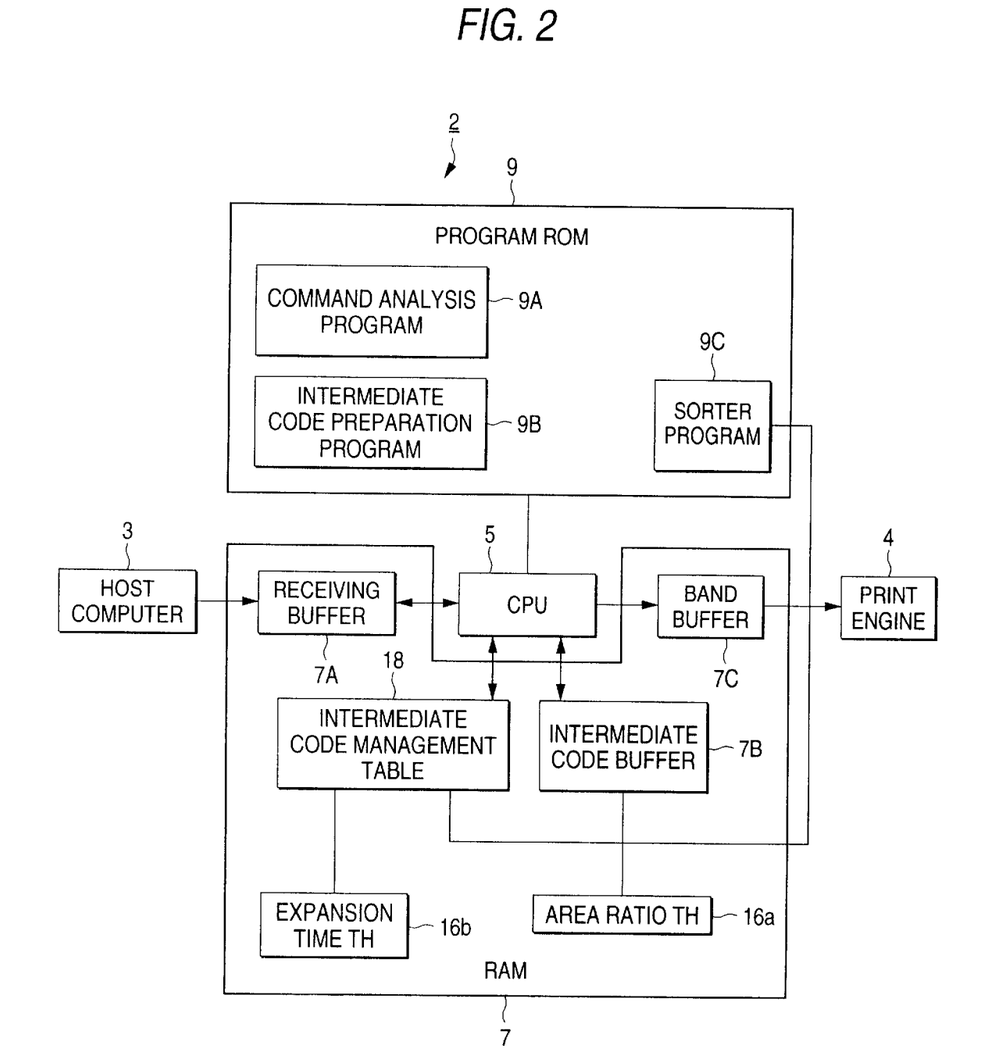
FIG. 2 shows the hardware configuration of the printer according to the embodiment.

As shown in FIGS. 1 and 2, the printer according to the first embodiment comprises a printer controller 2 and a print engine 4. As shown in FIG. 2, the printer controller 2 comprises a CPU 5, RAM 7, program ROM 9, etc. As shown in FIG. 1, the printer controller 2 functionally comprises a received data analysis section 8 which sequentially analyzes print (pixel) data 6 received from a host computer 3. The received data is stored in a receiving buffer 7A, on a per-band basis according to a command analysis program 9A. An intermediate code preparation section 10 prepares intermediate codes from the information analyzed by the received data analysis section 8 for each band according to an intermediate code preparation program 9B. An intermediate code management section 12 receives and manages a print image prepared by the received data analysis section 8 for each page and manages the intermediate code prepared by the intermediate code preparation section 10. An expansion processing section 14 expands the intermediate code to bit-map data in a band buffer 7C (through so-called band expansion) and transfers the bit-map data to the print engine 4.

The intermediate code management section 12 comprises a comparison-and-determination section 12a, an expansion time measurement section 12b, a management table preparation 12c, and a sorter section 12d. The comparison-and-determination section 12a compares intermediate codes which are currently being prepared or have been prepared by the intermediate code preparation section 10 with individual threshold values received from a threshold value source 16, on a per-band basis. As will be described later, the comparison-and-determination section 12a compares the size of the intermediate codes for one page with an area ratio threshold value 16a, and compares the time required for expanding the intermediate code measured by the expansion time measurement section 12b with an expansion time threshold value 16b. The management table preparation section 12c prepares a band management table 18a storing an intermediate code expansion time and the addresses of intermediate codes for each band, and prepares an expansion management table 18b from the band management table 18a. The sorter section 12d rearranges and converts the expansion management table 18b to a sorted expansion management table 18c.

The individual functional blocks, such as the received data analysis section 8, the intermediate code preparation section 10, the intermediate code management section 12, and the expansion processing section 14, are implemented by the processing unit shown in FIG. 2 (i.e., a CPU 5) performing required processing operations according to a set of instructions (a computer program) stored in instruction storage means such as program ROM 9 shown in FIG. 2 and required data stored in RAM 7.

The print engine 4 is an electrophotographic image forming process engine capable of operating at a predetermined engine speed. More specifically, the print engine (image forming process engine) 4 comprises a photosensitive member (drum) 22, an optical writing system 24 which exposes the photosensitive member (drum) 22 to light according to a print instruction received from the expansion processing section 14; a rotary developer 26; a transfer drum 28; a fixing unit 30; and a paper feed mechanism 32. The optical writing system 24 comprises a laser light source which is activated/deactivated so as to correspond to the individual dots of an image; and a polygon mirror which scans the surface of the photosensitive member (drum) in the widthwise direction of the image. On the surface of the photosensitive member (drum) 22 whose surface is uniformly charged, an electrostatic latent image is formed, by radiation, onto the surface of the photosensitive member 22, of light corresponding to image data by means of the optical writing system 24. Toner which is charged with the polarity opposite to that of the electrostatic latent image is caused to adhere to the latent image. The thus-formed toner image is transferred to a transfer sheet (or a recording medium 34) supplied from the paper feed mechanism 32, through use of the rotary developer 26 and the transfer drum 28 and by means of electrostatic force. The toner image is fused by the heat produced by the fixing unit 30.

The operation of the printer according to the first embodiment will now be0 described with reference to flowcharts shown in FIGS. 4 through 6.

Figure 3A:
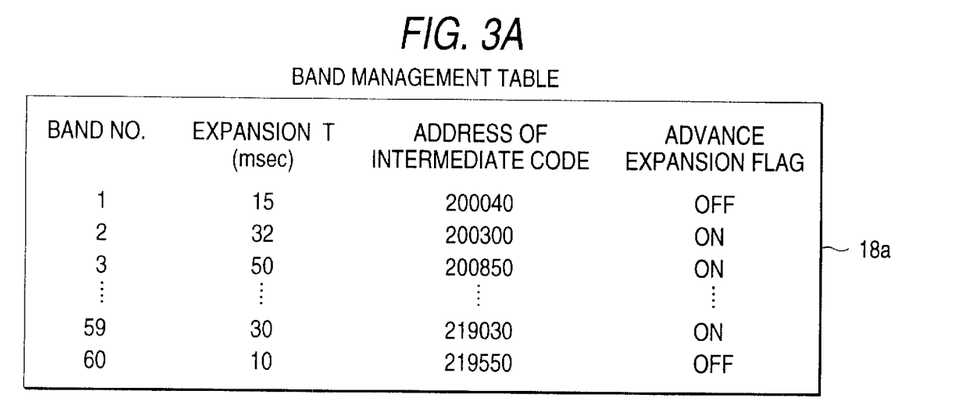
FIG. 3A shows a band management table.

The print data 6 transmitted from the host computer 3 are received (S401) and are stored in the receiving buffer 7A. The received data analysis section 8 acquires the print data 6 from the receiving buffer 7A and continues analysis of the print data 6 until analysis of the print data for one band is completed (S402). If the analysis of the print data is completed, the result of such analysis is transmitted to the intermediate code preparation section 10, and the intermediate code preparation section 10 is requested to prepare intermediate codes (S403). Processing operations in steps S401 to S403 are performed continuously until preparation of intermediate codes for one band is completed (S404). The thus-prepared intermediate code is stored in the intermediate code buffer 7B. As shown in FIG. 3A, the address of the intermediate code for the band is stored in the band management table 18a by means of the management table preparation section 12c of the intermediate management section 12.

After completion of preparation of intermediate codes for one band, the comparison-and-determination section 12a of the intermediate code management section 12 compares the area ratio threshold value 16a produced by the threshold value source 16 with the size of the intermediate codes for the band. More specifically, for instance, comparison is made between the amount of memory required for storing the intermediate code for the band and the amount of memory required for expanding the image data for the band to bit-map data (or a real image) (S405). If the amount of memory required for storing intermediate codes is greater than the amount of memory required for expanding the image data, the intermediate code is expanded to a real image, as mentioned previously. Specifically, in response to the result of comparison, the expansion processing section 14 expands the intermediate code for the band to a real image on the band buffer 7C (S406). In contrast, if the amount of memory required for storing the intermediate code is smaller than the amount of memory required for expanding the image data, the expansion time measurement section 12b measures the time required for expanding the intermediate code of the band (S407).

The above-described processing operations are repeated until the intermediate codes are produced in a number equal to that of the bands corresponding to one page (S408). After completion of producing the intermediate codes in a number equal to that of the bands corresponding to one page, various initial setting operations for band expansion are performed (S409). As shown in FIG. 3A, as in the case with the address of the intermediate code mentioned previously, the time required for expanding intermediate codes for each band is measured and stored in the band management table 18a with its respective band.

In the first embodiment, the expansion time threshold value 16b is set to a value of 20 milliseconds (msec.) on the basis of the capability of the CPU 5 and the processing speed (or engine speed) of the print engine 4, and the thus-set expansion time threshold value is stored in the RAM 7.

Figure 5:
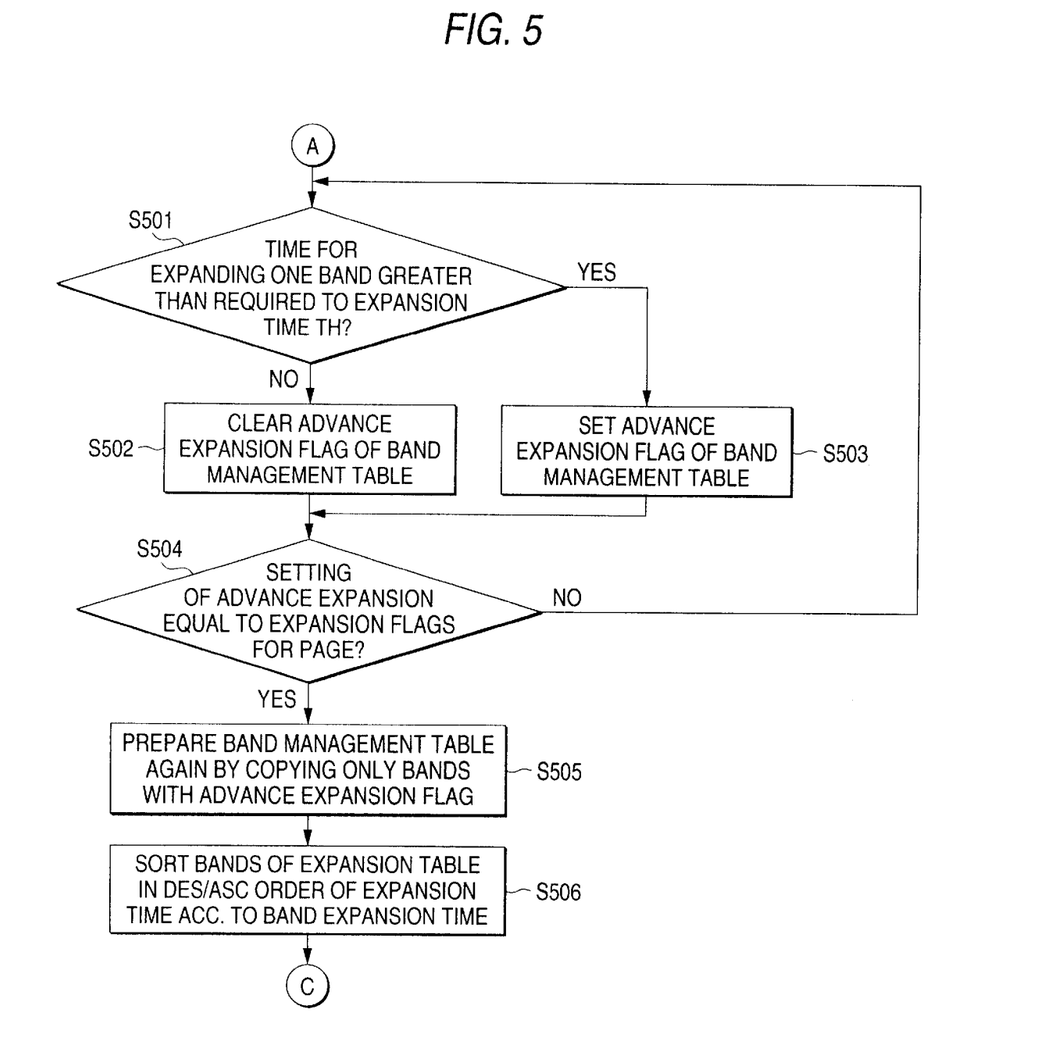
FIG. 5 is a flowchart for describing the operation of the printer according to the first embodiment.
Figure 6:
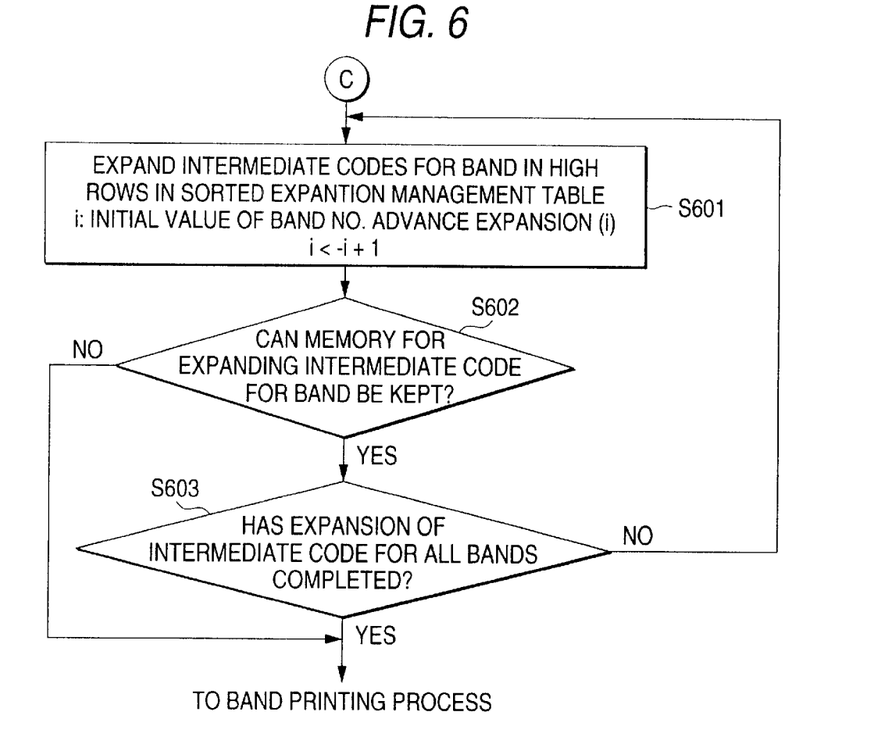
FIG. 6 is a flowchart for describing the operation of the printer according to the first embodiment.

As shown in FIG. 5, a processing operation relating to step S409 is followed by comparison between the time required for expanding the intermediate code of the band and the expansion threshold value 16b (S501). If the expansion time is shorter than a value of 20 msec., an advance expansion flag of the band management table 18a is cleared (S502). In contrast, if the expansion time is equal to or longer than a value of 20 msec., the advance expansion flag of the band management table 18a is set (S503). The processing operations in steps S501 to S503 are repeated until the setting of advance expansion flags corresponding to the number of bands in one page is completed (S504). As a result, as shown in FIG. 3A, the band management table 18a is completed.

Figure 3B:
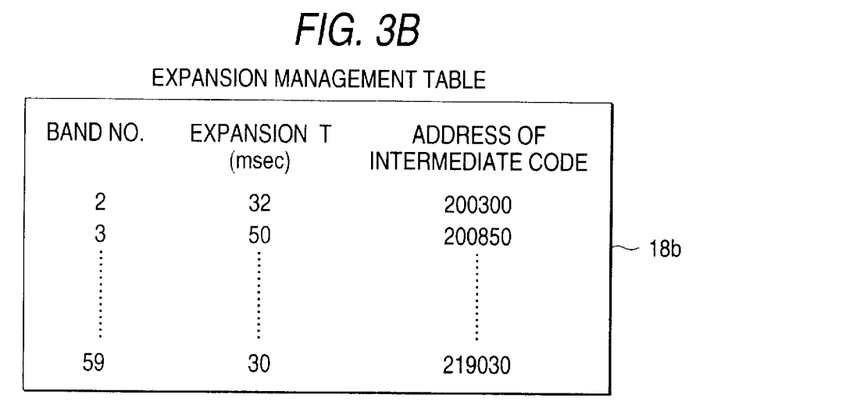
FIG. 3B shows an expansion management table for managing only the bands whose expansion times exceed a threshold value.
Figure 3C:
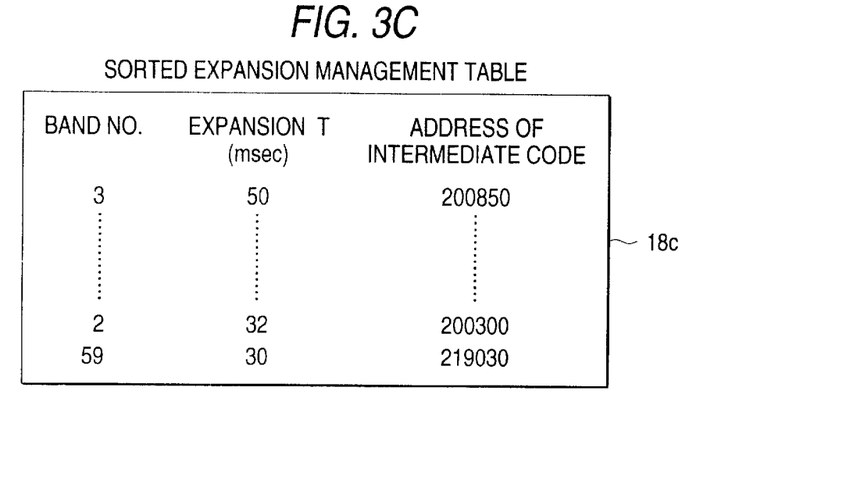
FIG. 3C shows an expansion management table after the bands of the management table have been sorted.

Subsequently, the management table preparation section 12c of the intermediate code management section 12 prepares the expansion management table 18b by copying the band management table 18a only during the period in which the advance expansion flag is set (S505), as shown in FIG. 3B. Further, the sorter section 12d sorts the expansion management table 18b according to the expansion time of each band stored in the development management table 18b (S506). All the bands provided in the expansion management table 18b are sorted in descending or ascending order of expansion time. As a result, as shown in FIG. 3C, the expansion development table 18b is converted into the sorted expansion management table 18c.

Through the foregoing processing operations, the intermediate codes for the band whose expansion time exceeds the expansion time threshold value 16b are expanded beforehand. As shown in FIG. 6, the intermediate codes are expanded to images for the bands on higher rows in the sorted expansion management table 18c (S601). As shown in FIG. 3C, the intermediate codes for band No. 3 having the longest expansion time of 50 msec. is expanded to a real image under provided that memory for advance expansion is reserved. More specifically, a check is made, for each band, as to whether or not memory for expansion can be reserved (S602). After completion of expansion of all the bands (S603), the printing of these bands is carried out.

As mentioned above, according to the first embodiment, the intermediate code whose size exceeds the area ratio threshold value is expanded to bit-map data beforehand. With regard to the intermediate codes whose sizes do not exceed the area ratio threshold value, only the bands whose expansion times exceed a predetermined threshold value are selected and sorted. The intermediate codes for the bands are expanded beforehand in descending order of expansion time, so long as the memory for expansion is reserved.

Since intermediate codes for the bands having a higher probability of causing an overrun error are expanded beforehand in descending order of band expansion time, memory is effectively used, frequency of overrun error can be effectively reduced without an unnecessary increase in memory. Since only the bands whose expansion times exceed a threshold value are selectively sorted, sorting time can be shortened when compared to the case where all the bands are sorted. Accordingly, an overrun error can be effectively prevented without a reduction in throughput.

A printer according to a second embodiment of the present invention will now be described by reference to FIG. 7.

The first embodiment is characterized by the expansion time threshold value being set to 20 msec. In contrast, the second embodiment is characterized by the expansion time threshold value being changeable by a print mode specified by the user.

Figure 7:
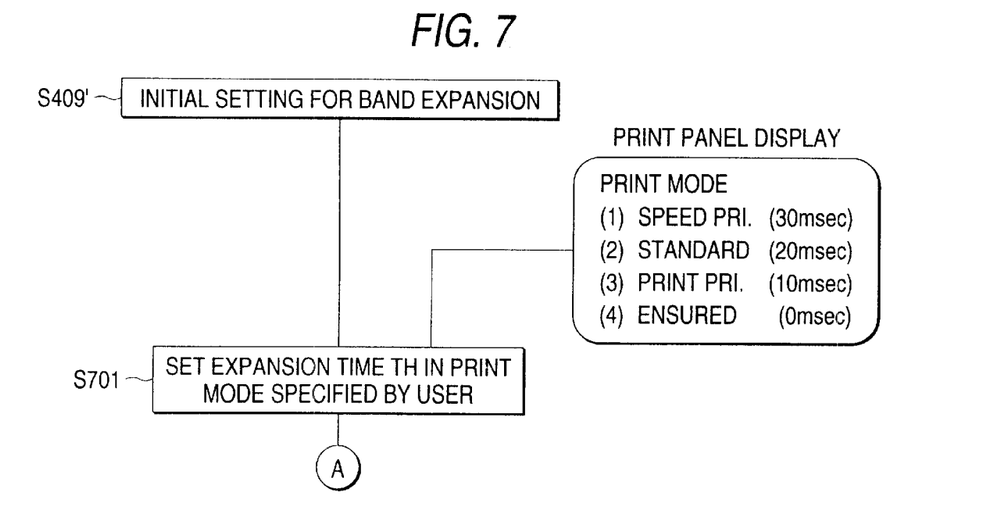
FIG. 7 is a flowchart for describing the operation of a printer according to a second embodiment of the present invention.

As shown in FIG. 7, the printer according to the second embodiment enables selection of a desired print mode from four modes, including a speed priority mode, a standard print mode, a print priority mode, and an ensured print mode, on a per-page basis by way of a touch panel on the printer. Four types of expansion time threshold values 16b (see FIGS. 1 and 2) are stored in the RAM 7 corresponding to the four modes, respectively. If the print mode is specified by the user by way of the printer panel, values corresponding to the remaining three print modes are selectively read and set from the three types of expansion time threshold values stored in the RAM 7, as part of the initial setting operation (S409') for band expansion (S701).

For example, when the user specifies the speed priority mode, only the bands whose expansion times exceed 30 msec. in the band management table 18a are taken as candidates for sorting and are sorted and, the number of bands to be expanded beforehand decreases. If the present invention is not utilized, there will be an increase in the probability of occurrence of an overrun error. However, according to the present invention, the intermediate codes for the bands, which would cause an overrun error, are expanded beforehand in descending order of probability, thereby resulting in a decrease in the probability of occurrence of an overrun error. In contrast, when the user selects a print priority mode, all the bands whose expansion times exceed 10 msec. in the band management table 18a are taken as candidates for sorting and are selectively sorted. Accordingly, there is an increase in the number of bands which are taken as candidates for sorting. The intermediate codes for these candidates, which would cause an overrun error, are expanded beforehand. As a result, most of the bands, which would cause an overrun error, are expanded beforehand, thereby ensuring a decrease in the probability of an overrun error.

If the user selects the ensured print mode shown in FIG. 7, the bands whose expansion times exceed 0 msec. in the band management table 18a; i.e., all the bands in the band management table 18a, are taken as candidates for sorting. The intermediate codes for the bands, which would cause an overrun error, are expanded beforehand, thereby ensuring a printing operation.

Figure 4:
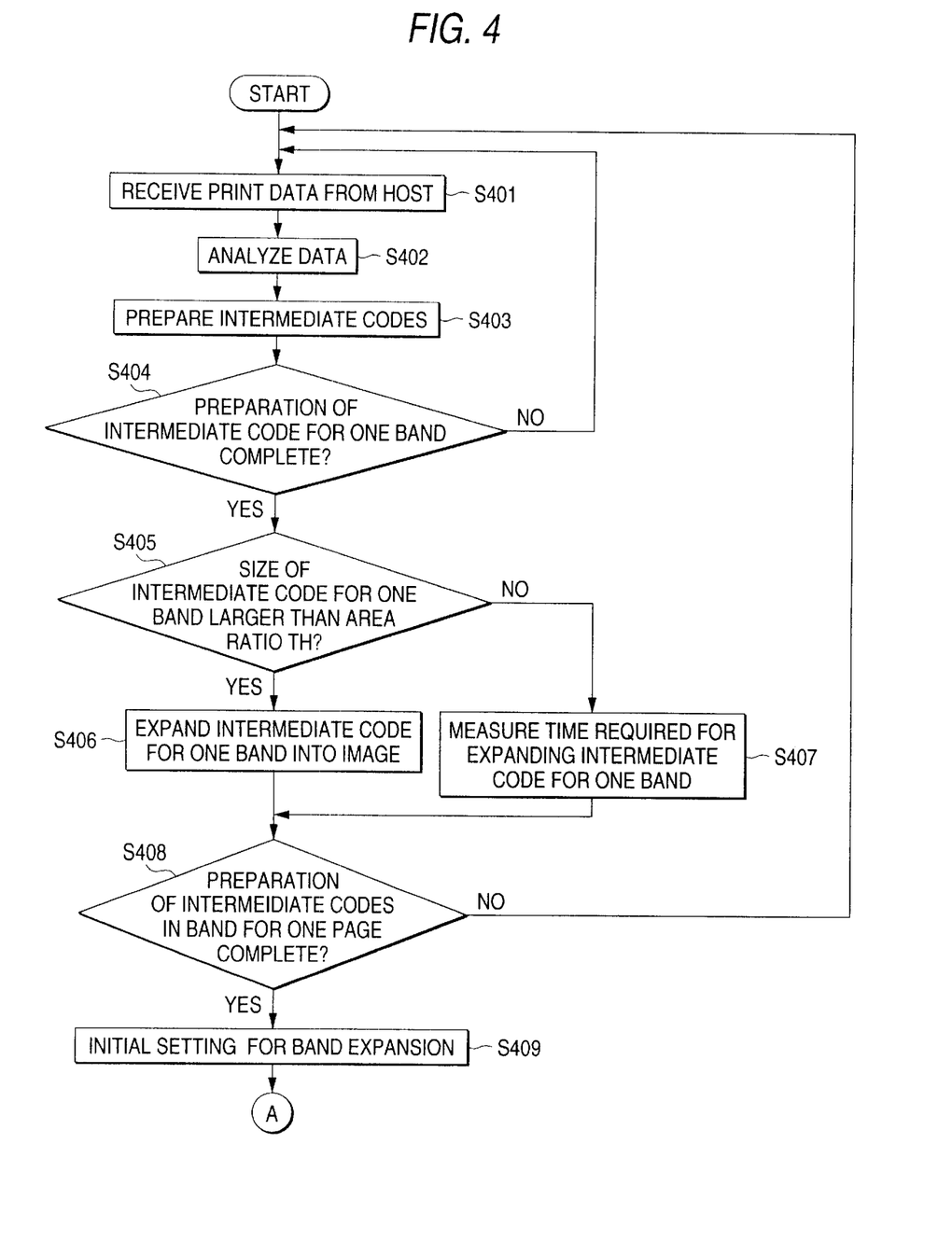
FIG. 4 is a flowchart for describing the operation of a printer according to a first embodiment of the present invention.

In the printer according to the second embodiment, the processing operation relating to S408 shown in FIG. 4 is followed by a processing operation corresponding to S701. Therefore, the second embodiment also yields an advantage of the ability to select an expansion time threshold value corresponding a print mode from among the four types of expansion time threshold values, on a per-page basis.

A printer according to a third embodiment of the present invention will now be described by reference to FIGS. 8 and 9.

The printer according to the third embodiment is similar to the printer according to the second embodiment because an expansion time threshold value can be changed and specified by the user according to a print mode. Hence, the printer according to the third embodiment is substantially identical in structure with the printer according to the second embodiment, and repetition of its description is omitted.

The third embodiment is distinguished by a check that is made as to whether or not there still remains a predetermined amount of memory for expanding an image, e.g., page memory, after preparation of intermediate codes for one page.

Figure 8:
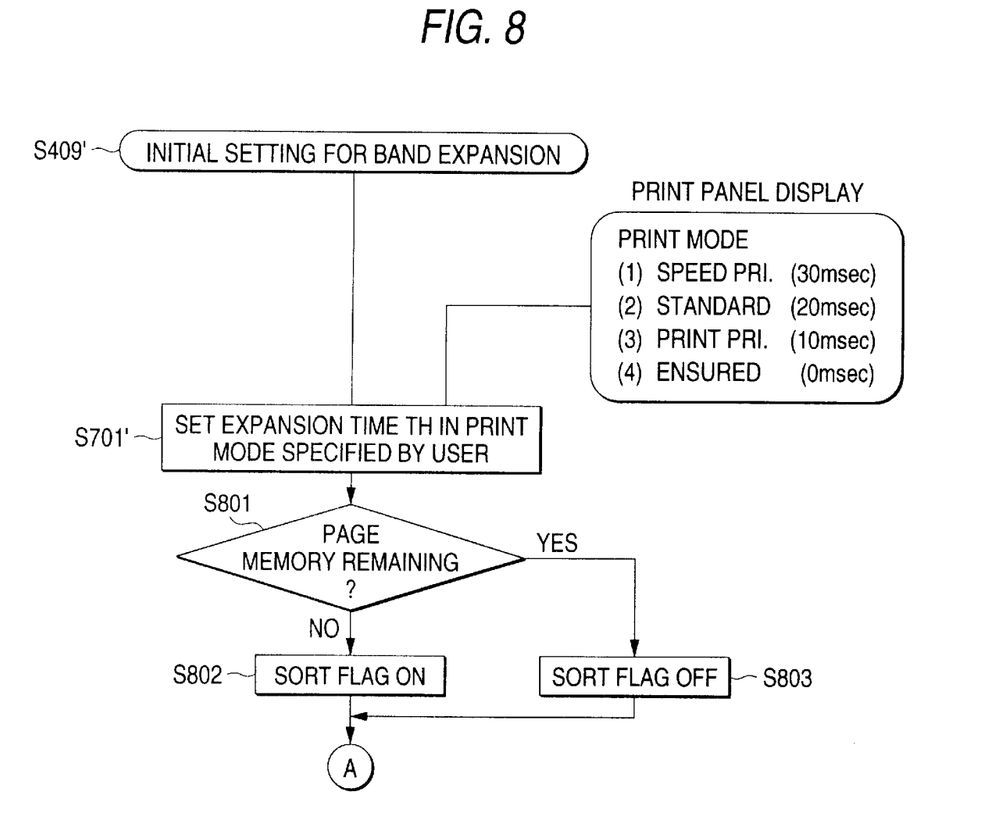
FIG. 8 is a flowchart for describing the operation of a printer according to a third embodiment of the present invention.
Figure 9:
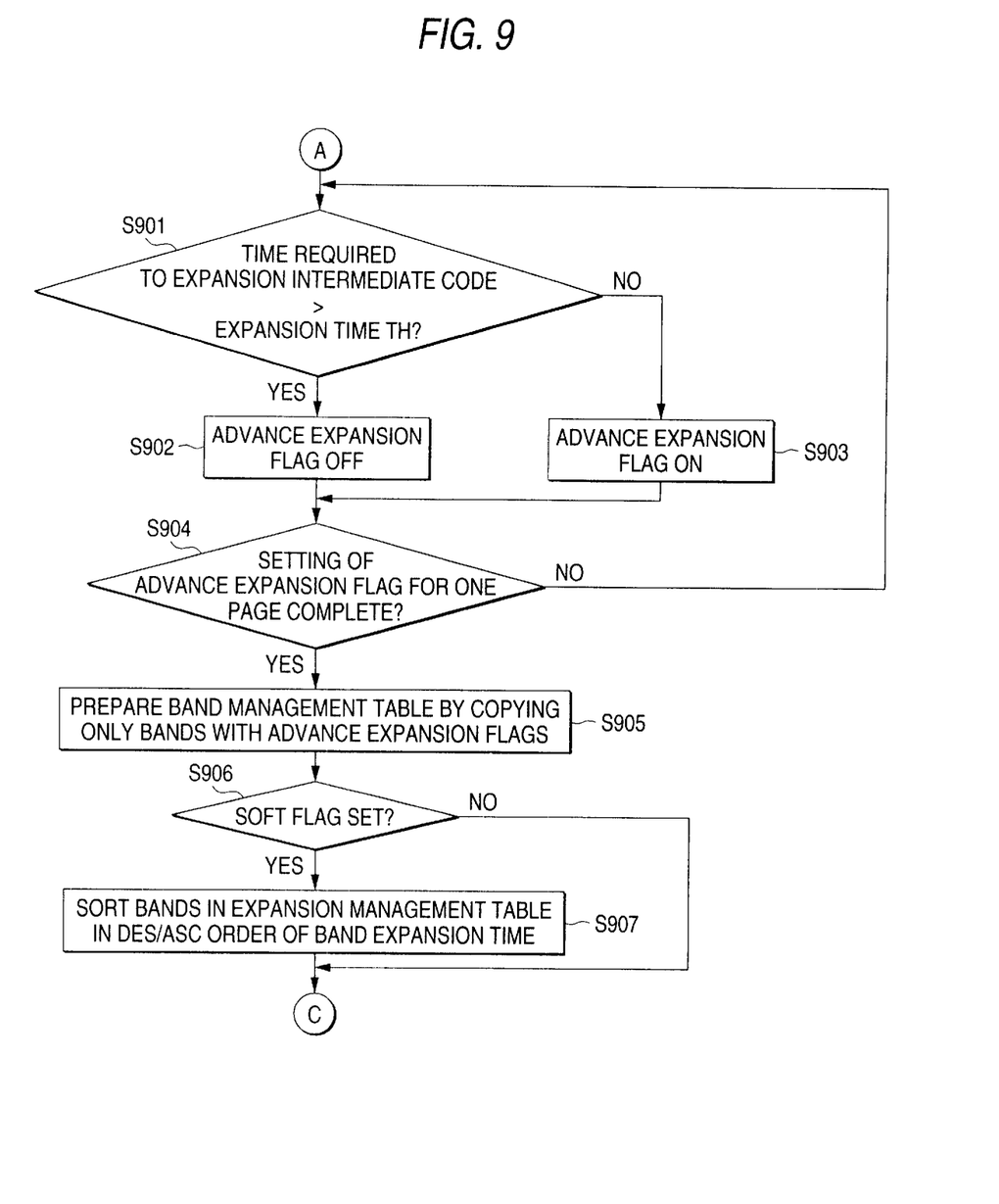
FIG. 9 is a flowchart for describing the operation of the printer according to the third embodiment.

As shown in FIG. 8, after the expansion time threshold value is specified by the user according to a print mode (S701'), a determination is made as to whether or not there still remains available page memory (S801). Only when no page memory is available, a sort flag is set (S802), and the bands of the expansion management table 18b are sorted by the sorter section 12d. If page memory is available, the sort flag is cleared (S803), and the sorter section 12d does not sort the bands of the expansion management table 18b.

If there still remains available page memory, the bands of the expansion management table are not sorted, thereby eliminating needless sorting time and shortening the same. Further, page memory can be effectively utilized according to the circumstances.

Although specific embodiments of the present invention have been described, the present invention is not limited to these embodiments. The present inventions can be applied to other embodiments within the scope of the invention described in the appended claims. For instance, the previously-described embodiments have been described with reference to the case where an electrophotographic (laser) printer is used as a page printer. The present invention can be widely applied to printers, so long as a printer (or an image input/output apparatus) may temporarily convert the print (image) data received from the host an intermediate code and store the thus-converted print data in the form of an intermediate code (in the first data format). The intermediate code is expanded into an image (or bit-map data) (in the second data format), and the image is printed.

In the second and third embodiments, the expansion time threshold value is set according to the print mode specified by way of the printer panel. The expansion time threshold value may be set according to a print mode included in a print instruction received from the host, by way of command analysis. Further, the expansion time threshold value may be freely selected (or set) on a utility screen of a printer driver.

As has been described above, according to the present invention, only the regions that satisfy predetermined conditions are taken as candidates for sorting. Therefore, when compared to a conventional example in which all the regions are sorted, the present invention shortens the sorting time, which in turn results in an increase in throughput.

Particularly, the regions are subjected to a determination as to whether or not an area ratio of the region exceeds a threshold value and as to whether or not a conversion time of the region exceeds a threshold value. With regard to the region whose area ratio exceeds the area ratio threshold value, intermediate codes for the region are unconditionally expanded beforehand. Further, only the regions whose conversion times exceed the threshold value are selectively sorted. The intermediate codes for the regions are expanded beforehand in descending order of conversion time. As a result, occurrence of an overrun error is effectively prevented, and sorting time can be considerably shortened when compared to the case where all the regions are sorted.

According to another aspect of the present invention, the throughput can be maintained and overrun can be avoided without an increase in memory.

According to an additional aspect of the present invention, a choice of maintaining a print speed or prevention of an overrun error can be prioritized. Thus, an optimum print environment may be achieved.

What is claimed is:

1. A printer which converts print data to a first data format for each of a plurality of predetermined regions, stores the print data of the first data format into memory, reads from the memory the print data in the first data format for each of the regions, converts the read print data of the first data format to a second data format in response to a print request to thereby expand the print data in the memory, and transmits the print data of the second data format to a print engine, said printer comprising:

a determiner which determines, for each of said plurality of predetermined regions, whether or not a processing criteria relating to an amount of processing required for converting the print data from the first data format to the second data format exceeds a predetermined threshold value;

a sorter receiving an output from said determiner, wherein said sorter sorts only candidate regions having processing criteria determined to exceed the predetermined threshold value; and wherein said sorter sorts the candidate regions in descending order of the processing criteria after said determiner determines whether the threshold value has been exceeded for all of the predetermined regions;

a converter which converts the print data from the first data format into the second data format in descending order of the processing criteria for each of the regions; and a print engine to print data based on the print data of the second data format.

2. The printer as defined in claim 1, wherein the first data format corresponds to an intermediate code; the second data format corresponds to bit-map data; the processing criteria includes at least a time required to convert the print data from the intermediate code to the bit-map data, for each of the predetermined regions; and only the regions whose conversion times have been determined to exceed the predetermined threshold value are taken as candidates for sorting by said sorter.

3. The printer as determined in claim 2, wherein the processing criteria further includes a ratio of area of the intermediate code to that of the bit-map data; and, for the regions whose area ratio has been determined to exceed a predetermined threshold value, the print data related to the regions are converted from the first data format to the second data format regardless of the conversion time for the respective region, and the data converted to the second data format are stored in the memory.

4. The printer as defined in claim 1, wherein the converter converts print data of the first data format to print data of the second data format and stores said print data of the second data format into the memory before sending data to the print engine, while an amount of memory for storing the print data can be reserved.

5. The printer as defined in claim 2, wherein the converter converts print data of the first data format to print data of the second data format and stores said print data of the second data format into the memory before sending data to the print engine, while an amount of memory for storing the print data can be reserved.

6. The printer as defined in claim 3, wherein the converter converts print data of the first data format to print data of the second data format and stores said print data of the second data format into the memory before sending data to the print engine, while an amount of memory for storing the print data can be reserved.

7. The printer as defined in claim 1, further comprising a threshold determiner, wherein said threshold determiner determines a plurality of different values as candidates for the predetermined threshold value, and one of the plurality of values is selected as the predetermined threshold value according to at least one of a print speed and a probability of occurrence of an overrun error.

8. The printer as defined in claim 2, further comprising a threshold determiner, wherein said threshold determiner determines a plurality of different values as candidates for the predetermined threshold value, and one of the plurality of values is selected as the predetermined threshold value according to at least one of a print speed and a probability of occurrence of an overrun error.

9. The printer as defined in claim 3, further comprising a threshold determiner, wherein said threshold determiner determines a plurality of different values as candidates for the predetermined threshold value, and one of the plurality of values is selected as the predetermined threshold value according to at least one of a print speed and a probability of occurrence of an overrun error.

10. The printer as defined in claim 4, further comprising a threshold determiner, wherein said threshold determiner determines a plurality of different values as candidates for the predetermined threshold value, and one of the plurality of values is selected as the predetermined threshold value according to at least one of a print speed and a probability of occurrence of an overrun error.

11. The printer as defined in claim 5, further comprising a threshold determiner, wherein said threshold determiner determines a plurality of different values as candidates for the predetermined threshold value, and one of the plurality of values is selected as the predetermined threshold value according to at least one of a print speed and a probability of occurrence of an overrun error.

12. The printer as defined in claim 6, further comprising a threshold determiner, wherein said threshold determiner determines a plurality of different values as candidates for the predetermined threshold value, and one of the plurality of values is selected as the predetermined threshold value according to at least one of a print speed and a probability of occurrence of an overrun error.

13. The printer as defined in claim 4, wherein if there still remains memory for expanding print data for one page, the print data of said plurality of regions are not sorted by said sorter.

14. The printer as defined in claim 5, wherein if there still remains memory for expanding print data for one page, the print data of said plurality of regions are not sorted by said sorter.

15. The printer as defined in claim 6, wherein if there still remains memory for expanding print data for one page, the print data of said plurality of regions are not sorted by said sorter.

16. The printer as defined in claim 7, wherein the print data for all the regions are expanded beforehand depending on one of a print speed and a probability of occurrence of an overrun error.

17. The printer as defined in claim 8, wherein the print data for all the regions are expanded beforehand depending on one of a print speed and a probability of occurrence of an overrun error.

18. The printer as defined in claim 9, wherein the print data for all the regions are expanded beforehand depending on one of a print speed and a probability of occurrence of an overrun error.

19. The printer as defined in claim 10, wherein the print data for all the regions are expanded beforehand depending on one of a print speed and a probability of occurrence of an overrun error.

20. The printer as defined in claim 11, wherein the print data for all the regions are expanded beforehand depending on one of a print speed and a probability of occurrence of an overrun error.

21. The printer as defined in claim 12, wherein the print data for all the regions are expanded beforehand depending on one of a print speed and a probability of occurrence of an overrun error.

22. A method of printing data with a printer, in which print data are expanded into bit-map data in place of intermediate codes before a print request is made, the method comprising:
preparing intermediate codes for one band, with regard to the print data corresponding to one page received from a host;
determining, for each of the bands, whether or not a time required for converting the intermediate codes into bit-map data exceeds a predetermined threshold value;
taking, as candidate bands for sorting, the bands having conversion times determined to exceed the threshold value in said determining step;
sorting the candidate bands in descending order of conversion time after determination has been made for all of the bands; and
converting the print data of the sorted bands, in advance of a print request, to the bit-map data in descending order of conversion time, and storing the bit-map data into memory.

23. A recording medium on which is recorded a program for use with a printer, in which print data are expanded into bit-map data in place of intermediate codes before a print request is made, the program comprising:
program code means for preparing intermediate codes for one band, with regard to the print data corresponding to one page received from a host;
program code means for determining, for each of the bands, whether or not the time required for converting the intermediate codes into bit-map data exceeds a predetermined threshold value;
program code means for taking, as candidate bands for sorting, the bands having conversion times determined to exceed the threshold value;
program code means for sorting the candidate bands in descending order of conversion time after determination has been made for all of the bands; and
program code means converting the print data of the thus-sorted bands, in advance of a print request, to the bit-map data in descending order of conversion time, and storing the bit-map data into a memory.

24. A printer controller which converts print data to a first data format for each of a plurality of predetermined regions, stores the converted print data of the first data format into memory, reads from the memory the print data in the first data format for each of the regions, converts the read print data of the first data format to a second data format in response to a print request to thereby expand the print data in the memory, and transmits the print data of the second data format to a print engine, said controller comprising:
a determiner which determines, for each of said plurality of predetermined regions, whether or not a processing criteria relating to an amount of processing required for converting the print data from the first data format to the second data format exceeds a predetermined threshold value;
a sorter receiving an output from said determiner,
wherein said sorter sorts only candidate regions having processing criteria determined to exceed the predetermined threshold value; and
wherein said sorter sorts the candidate regions in descending order of the processing criteria after said determiner determines whether the threshold value has been exceeded for all of the predetermined regions; and
a converter which converts the print data from the first data format into the second data format in descending order of the processing criteria, for each of the regions.

25. The printer controller as defined in claim 24, wherein the first data format corresponds to an intermediate code; the second data format corresponds to bit-map data; the processing criteria includes at least a time required to convert the print data from the intermediate code to the bit-map data, for each of the predetermined regions; and only the regions whose conversion times have been determined to exceed the predetermined threshold value are taken as candidates for sorting by said sorter.

26. An image input/output apparatus which stores input image data into memory in a first data format for each of a plurality of predetermined regions, reads from the memory the image data in a first data format for each of the regions, converts the read image data to a second data format, and outputs the image data of the second data format, said input/output apparatus comprising:

a determiner which determines, for each of said plurality of predetermined regions, whether or not a processing criteria relating to an amount of processing required for converting the image data from the first data format to the second data format exceeds a predetermined threshold value;

a sorter receiving an output from said determiner, wherein said sorter sorts only candidate regions having processing criteria determined to exceed the predetermined threshold value; and wherein said sorter sorts the candidate regions in descending order of the processing criteria after said determiner determines whether the threshold value has been exceeded for all of the predetermined regions;

a converter which converts the image data from the first data format into the second data format in descending order of the processing criteria for each of the regions; and a print engine to print data based on the image data of the second data format.

27. A print system including:

a host for generating a print instruction, and a printer which analyzes the print instruction received from the host and converts print data included in the print instruction to a first data format for each of a plurality of predetermined regions, stores the converted print data into memory, reads from the memory the print data in the first data format for each of the regions, converts the read print data to a second data format in response to a print request to thereby expand the print data in the memory, and transmits the expanded print data in the second data format to a print engine, thereby printing the print data, wherein said printer comprises:

a determiner which determines, for each of said plurality of predetermined regions, whether or not a processing criteria relating to an amount of processing required for converting the print data from the first data format to the second data format exceeds a predetermined threshold value;

a sorter receiving an output from said determiner, wherein said sorter sorts only candidate regions having processing criteria determined to exceed the predetermined threshold value; and wherein said sorter sorts the candidate regions in descending order of the processing criteria after said determiner determines whether the threshold value has been exceeded for all of the predetermined regions;

a converter which converts the print data from the first data format into the second data format in descending order of the processing criteria for each of the regions; and a print engine to print data based on the print data of the second data format.

28. The print system as defined in claim 27, further comprising a threshold determiner, wherein said threshold determiner determines a plurality of different values as candidates for the predetermined threshold value, and one of the plurality of values is selected as the predetermined threshold value according to at least one of a print speed and a probability of occurrence of an overrun error.

29. A method for controlling a printer in which print data are expanded from a first data format into a second data format for printing the print data via a print engine, said method comprising:

a) receiving print data from a host computer b) preparing print data of the first data format from the received print data on a region by region basis;

c) determining whether the print data of the first data format requires more memory space for storage than corresponding print data in the second data format;

d) when it is determined that the print data of the first data format requires more memory space for storage than corresponding print data in the second data format, converting said print data of the first data format into the second data format;

e) determining whether a number of processed regions corresponds to a number of regions in a page, repeating steps a) through e) until the number of processed regions corresponds to a number of regions in a page;

f) for each respective region, determining whether a processing criteria for expanding data from the first data format into the second data format exceeds a threshold value;

g) setting a flag for a respective region where the processing criteria exceeds the threshold value in said step f);

h) for each region having a set flag, sorting the respective regions in descending order based on the processing criteria; and i) converting the print data from the first data format to the second data format for each of the sorted respective regions in descending order, in advance of a print request, and storing the print data of the second data format to a memory.

* * * * *